No. 697,059. Patented Apr. 8, 1902.
G. T. WILLIS & J. PORTEOUS.
CULTIVATOR.
(Application filed Sept. 20, 1901.)
(No Model.)
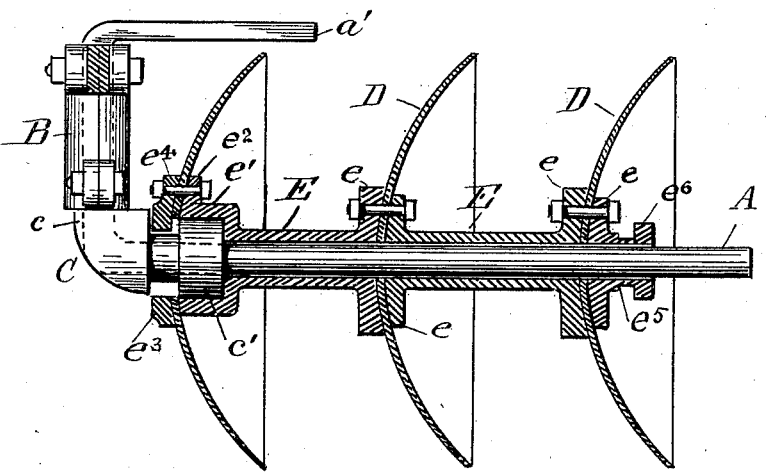
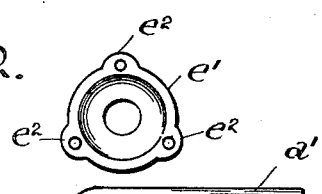
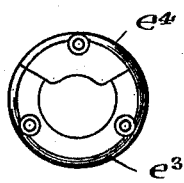
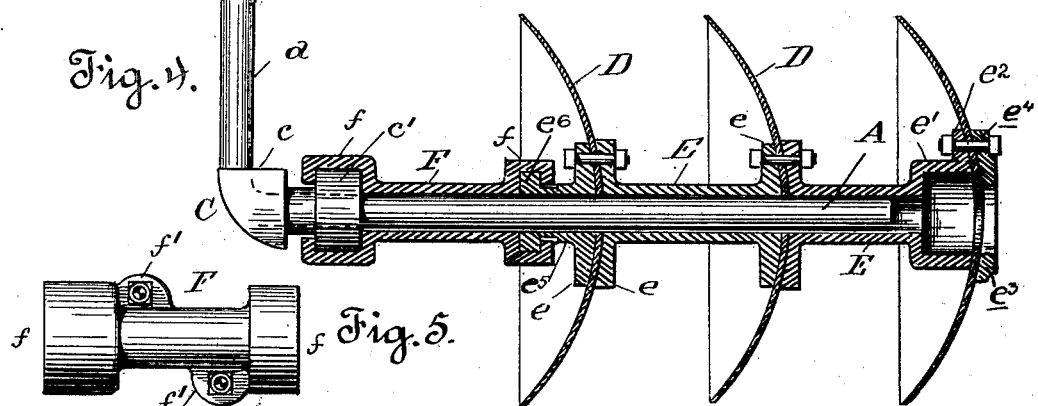
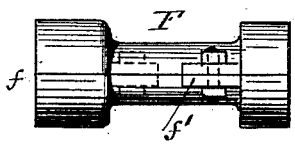
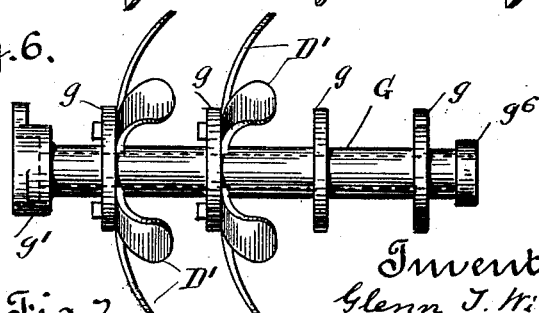
Witnesses.
J. C. Monteverde.
Walter F. Vance.
Inventors,
Glenn T. Willis,
and James Porteous,
by Wm. F. Booth,
their Attorney.
THE NORRIS PETERS CO., PHOTO-LITHO., WASHINGTON, D. C.

UNITED STATES PATENT OFFICE.

GLENN T. WILLIS AND JAMES PORTEOUS, OF FRESNO, CALIFORNIA; SAID WILLIS ASSIGNOR TO SAID PORTEOUS.

CULTIVATOR.

SPECIFICATION forming part of Letters Patent No. 697,059, dated April 8, 1902.

Application filed September 20, 1901. Serial No. 75,691. (No model.)

*To all whom it may concern:*

Be it known that we, GLENN T. WILLIS and JAMES PORTEOUS, citizens of the United States, residing at Fresno, county of Fresno, and State of California, have invented certain new and useful Improvements in Cultivators; and we do hereby declare the following to be a full, clear, and exact description of the same.

Our invention relates to that class of cultivators in which the operative agency or attachment, whether in the form of gangs of disks, a series of spading-teeth, clod-crushing rollers, or pruning-knives, or other cultivating devices, is mounted upon an axle and rotates. Of such "cultivators," using the term broadly to include harrows, scarifiers, pulverizers, rollers, spaders, and the like, the disk harrow is the form to which our present invention is best adapted, and it is in connection with such an implement, and particularly with the harrow illustrated by the Patent No. 670,070, granted March 19, 1901, upon our application, that we prefer herein to describe our invention.

In mounting the disk gang or other attachment upon the axle the provision heretofore made for reversing it, to throw the earth from or to the center, and to hold it on the axle in either position we have found to be not as convenient of change and replacement as it should be and not adapted for the ready substitution of other forms of cultivator attachments, such as spading-teeth, rollers, and knives.

Our present invention is an improvement in the means for securing these cultivator attachments on the axle, and has for its object a secure fastening capable of being readily made and broken, to permit the reversal of attachment, and to form a practical and durable dust-proof bearing.

Our invention consists in the novel couplings which we shall now fully describe by reference to the accompanying drawings, in which—

Figure 1 is a view of one of the axles, showing the mounting of a disk gang thereon and the fastening or coupling therefor for holding it on the axle when arranged to throw the earth from the center. Fig. 2 is an elevation of the coupling-flange on one end of the hub of the disk gang. Fig. 3 is a view of the coupling-flange directly engaging the hub-flange and the axle-collar. Fig. 4 is a view showing the disk gang reversed to throw the earth to the center and showing the coupling-box, in section, for this position. Fig. 5 is a top view of said coupling-box. Fig. 6 is a side view of same. Fig. 7 is a view of a spading attachment adapted to be fitted and held upon the axle in the same manner as the disk gang is fitted and held.

A is an axle having an upturned stem $a$ and a top lever-arm $a'$. The stem $a$ of the axle is mounted pivotally in a suitable bearing-box (indicated by B) of a general frame unnecessary herein to show, and the lever-arm $a'$ is adapted to have suitable connections whereby the stem may be turned and the axle thrown to different inclinations, as is customary in this type of implement. Upon axle A at its junction with the stem is a collar $c'$. This may be fitted or secured upon the axle in any suitable manner, either adjustably, to regulate its position on the axle, or fixedly. We have here shown it as being part of a casting C, formed with a bearing $c$ for the central box B, the whole being cast on the axle.

D represents the disks, each being centrally perforated.

E represents sleeves, each having a flange $e$ on each end. The disks are bolted between adjacent flanges of adjacent sleeves, thereby forming a rigid gang having a continuous dust-proof bearing for mounting it upon the axle A.

In order to hold the gang upon the axle with the disks arranged to throw the earth from the center, as in Fig. 1, the inner end of the innermost sleeve or hub is enlarged to form a socket-flange $e'$, having an interior diameter adapting it to freely receive the fixed axle-collar $c'$, and having three lugs $e^2$, Fig. 2, to receive the bolts which secure the innermost disk. This forms one side of the coupling. The other side of the coupling, Fig. 3, is formed by a flange composed of a section $e^3$, having two holes, and an interior opening large enough to pass over the collar $c'$, and another section $e^4$, having one hole and an inner opening too small to pass over said collar. This composite flange lies upon the convex side of the disk, and when both its sections are bolted thereto and to the flange $e'$, as shown in Fig. 1, the smaller section $e^4$ fits down behind the collar $c'$ and forms a stop or engagement therewith, thereby holding the disk gang on the axle and preventing it from slipping off when turning a corner or traveling on the road. When at work, the pressure being to the center, the disk gang remains on the axle and the coupling is free to revolve. Now by removing one bolt—namely, that through the smaller or stop section $e^4$ of the composite coupling—said section can be readily removed, whereupon the other section can be drawn over collar $c'$ and the disk gang removed from the axle to be reversed or to be loaded in a wagon.

In Fig. 4 is shown the disk gang reversed to throw the earth to the center. The coupling in this case is as follows: The outermost flange or hub $e$ is provided with a neck $e^5$, terminating in a collar $e^6$. F, Figs. 5 and 6, is a two-part or divided box, having coupling-sockets $f$ at each end. This box is fitted over the axle, and its coupling-sockets $f$ embrace the collars $c'$ and $e^6$, as shown in Fig. 4. The parts of the box are provided with lugs $f'$ to receive bolts to bolt them together, as in Fig. 6. This coupling-box is free to revolve and forms a durable and dust-proof coupling easily removable. These boxes can be made of different lengths to suit the distance required in the center. These means for holding the gang upon the axle are not confined to disk gangs. For example, we show in Fig. 7 a gang of spading-teeth. In this the central hub of the gang consists of a hollow cylinder G with flanges $g$, to which the teeth D' are bolted, and having at one end a socket-flange $g'$, similar to $e'$, heretofore described, and at the other end it has a collar $g^6$, similar to collar $e^6$ of the disk gang. The fitting and holding of this spading attachment upon the axle A are by means of the same coupling connections heretofore described. In same manner a clod-crushing roller attachment might be made to be fitted upon axle A, or a wheel with knives for summer pruning, or any other attachment having a central hub adapted to be mounted upon the axle A, in every case the hub being formed at its ends with the coupling flange and collar described and adapted to engage with the axle-collar and to receive the removable couplings heretofore shown, thus permitting any suitable cultivator attachment to be readily fitted and held upon the axle and removed for reversal or transportation or substitution of other attachments.

Having thus described our invention, what we claim as new, and desire to secure by Letters Patent, is—

1. In a cultivator, the combination of an axle having a collar at its inner end, a cultivator attachment having a hub adapted to be mounted upon said axle, said hub having at one end a socket-flange adapted to fit over the axle-collar, a composite coupling-flange adapted to be bolted to the socket-flange of said attachment and made of two sections one having an inner opening large enough to pass over the axle-collar and the other having an inner opening too small to pass over said collar, whereby engagement is made and broken with said axle-collar according as the smaller section is fitted to place or removed, and a suitable removable coupling engaging the axle-collar for holding said attachment on the axle, substantially as described.

2. In a cultivator, the combination of an axle having a collar at its inner end, a cultivator attachment having a hub adapted to be mounted upon said axle, said hub having at one end a socket-flange adapted to fit over the axle-collar, and at the other end a collar, a composite coupling-flange adapted to be bolted to the socket-flange of said attachment and made of two sections one having an inner opening large enough to pass over the axle-collar and the other having an inner opening too small to pass over said collar, whereby engagement is made and broken with said axle-collar according as the smaller section is fitted to place or removed, and a suitable removable coupling engaging the axle-collar for holding said attachment on the axle, consisting of a divided box having end sockets adapted to engage the axle-collar and the hub-collar.

3. In a cultivator, the combination of an axle having a collar at one end, a cultivator attachment having a hub adapted to be mounted upon said axle, said hub having at one end a socket-flange adapted to fit over the axle-collar, and a composite coupling-flange secured to the socket-flange and made of two sections, one having an inner opening adapted to pass over the axle-collar and the other having an extended portion adapted to project behind said axle-collar; substantially as described.

4. In a cultivator, the combination of an axle having a collar at its inner end, a cultivator attachment having a hub adapted to be mounted upon said axle, and provided with a collar on one end, and a divided coupling-box having end sockets adapted to engage the axle and hub collars.

5. In a cultivator, the combination of an axle having a collar at its inner end, a cultivator attachment having a hub adapted to be mounted upon said axle, and provided with a collar on one end, a divided coupling-box having end sockets adapted to engage the axle and hub collars when the attachment is in one position and means adapted to engage the axle-collar, for holding said attachment on the axle when the attachment is in reversed position; substantially as described.

6. In a cultivator, the combination with an axle having a collar, a reversible cultivator attachment adapted to be mounted on said axle, and means at the ends of said attachment adapted to engage the collar on the axle to secure the attachment in reversed positions on the axle; substantially as described.

In witness whereof we have hereunto set our hands.

GLENN T. WILLIS.
JAMES PORTEOUS.

Witnesses:
W. J. KETTRELL,
F. ROBB.